United States Patent [19]

Partlo

[11] Patent Number: 5,684,822
[45] Date of Patent: Nov. 4, 1997

[54] LASER SYSTEM WITH ANAMORPHIC CONFOCAL UNSTABLE RESONATOR

[75] Inventor: William N. Partlo, San Diego, Calif.

[73] Assignee: Cymer, Inc., San Diego, Calif.

[21] Appl. No.: 341,382

[22] Filed: Nov. 17, 1994

[51] Int. Cl.$^6$ ........................................ H01S 3/08
[52] U.S. Cl. .................... 372/95; 372/99; 372/101
[58] Field of Search .......................... 372/95, 99, 101

[56] References Cited

U.S. PATENT DOCUMENTS

| | | |
|---|---|---|
| 4,646,314 | 2/1987 | Opower . |
| 4,930,138 | 5/1990 | Opower . |
| 5,199,042 | 3/1993 | Papetti et al. . |
| 5,412,681 | 5/1995 | Eisel et al. ........................ 372/99 |

*Primary Examiner*—Rodney B. Bovernick
*Assistant Examiner*—Robert E. Wise
*Attorney, Agent, or Firm*—Blakely, Sokoloff, Taylor & Zafman LLP

[57] ABSTRACT

The resonator of the laser system employs a pair of anamorphic mirrors in combination with a pair of anamorphic lenses. The lenses are positioned between the mirrors on opposing ends of a laser resonator cavity. In one embodiment, both the mirrors and lenses have cylindrical cross-sections with the lenses oriented at ninety degrees from the mirrors. In use, a laser pulse is generated within a lasing cavity between the lenses and mirrors. The anamorphic configuration of the lenses and mirrors operates to minimize any differences between the vertical and horizontal divergence of the beam. Preferably, the beam consists of a sequence of individual pulses with the lenses and mirrors configured to ensure that differences in divergence are substantially eliminated after a selected number of laser pulse bounces. Method and apparatus embodiments are described herein.

23 Claims, 4 Drawing Sheets

LASER SYSTEM WITH ANAMORPHIC CONFOCAL UNSTABLE RESONATOR

BACKGROUND OF THE INVENTION

1. Field of the Invention

The invention generally relates to laser systems, and in particular to excimer laser systems employing unstable resonators.

2. Description of Related Art

Lasers typically employ a resonator cavity for use in generating a laser beam. An exemplary resonator cavity for an excimer laser is illustrated in FIG. 1A. The resonator includes a pair of mirrors 10 and 12 positioned facing one another on opposing ends of the resonator with a pair of electrodes 14 and 16 positioned longitudinally along at least a portion of the length of the resonator. The electrodes are employed to excite a gas, typically chlorine or fluorine, to generate a lazing beam 18. For a typical excimer laser, the lazing beam is pulsed, i.e., a control system (not shown) is provided to cyclically activate electrodes 14 and 16 to generate a sequence of discrete laser pulses.

The resonator of FIG. 1A is referred to as a stable resonator because mirrors 10 and 12 are curved to focus laser beam 18 into a confined path. More specifically, each mirror 10 and 12 is a generally concave mirror having a radially symmetric configuration. By employing a pair of concave mirrors, a laser pulse bouncing back and forth between the mirrors within the resonator cavity is confined within a narrow beam.

Originally, all excimer lasers included stable resonator cavities. More recently, resonator configurations having "unstable" resonator cavities have been developed with success. FIG. 1B illustrates an unstable resonator cavity for an excimer laser. As with the resonator of FIG. 1A, the resonator of FIG. 1B includes a pair of mirrors 18 and 20 positioned on opposing ends of a resonator cavity. A pair of electrodes 22 and 24 are arranged longitudinally along the cavity to excite a lazing gas contained within the cavity. However, unlike the stable resonator cavity which employs concave mirrors, the unstable resonator of FIG. 1B includes at least one convex mirror. In FIG. 1B, the convex mirror is identified by reference numeral 18. By employing a convex mirror rather than a concave mirror, a diverging laser beam is generated within the cavity. In other words, as a laser pulse bounces back and forth between mirrors 18 and 20, the width or beam waist of the laser pulse diverges or spreads out. Hence, the resonator is said to be unstable.

In the example of FIG. 1B, mirror 20 is a concave mirror. In other configurations, however, both mirrors are convex and in still other configurations, one mirror may be convex while the other is a flat mirror. Regardless of the specific configuration of the unstable resonator cavity, the provision of at least one non-concave-shaped component causes a laser pulse bouncing within the cavity to diverge.

A primary advantage of employing an unstable resonator is that high radiance emission is achieved (wherein radiance is the power radiated per unit area of output per unit solid-angle). A general discussion of the operation and advantages of unstable resonators is provided in "The Physics and Technology of Laser Resonators," edited by D. R. Hall and P. E. Jackson, published by Adam Hilger, Bristol and New York, Ref. Chapter 2, "Unstable Resonators" written by P. E. Dyer.

Many practical excimer laser configurations employ a cavity having a generally rectangular cross section. Unstable resonator mirrors for use with such a cavity are illustrated within FIGS. 2A and 2B with FIG. 2A providing a horizontal cross-section of the cavity and FIG. 2B providing a vertical cross-section of the cavity. As can be seen from a comparison of FIGS. 2A and 2B, each of a pair of resonator mirrors 26 and 28 are themselves substantially rectangular. It should be noted that the reflecting surface of each of the mirrors is radially symmetric. However, the surface of the mirror is truncated such that the overall shape of the mirrors is rectangular. In other implementations, substantially circular resonator mirrors are employed with the cavity itself having a rectangular cross-section, such that only those portions of a laser beam reflecting from a rectangular center portion of each mirror are reflected within the cavity.

Although the use of a cavity having a rectangular cross-section provides advantages for certain practical applications, the rectangular cross-section of the cavity or of the resonator mirrors results in certain disadvantages. In particular, because of the non-symmetric structure of the resonator, an amount of beam divergence in a vertical direction differs from an amount of beam divergence in a horizontal direction. For certain applications, any significant difference between the vertical and horizontal divergence is unacceptable. Hence, it is desirable to provide a resonator which minimizes the difference in divergence in the horizontal and vertical directions to yield a substantially symmetric beam within a non-symmetric resonator cavity.

SUMMARY OF THE INVENTION

In accordance with at least one aspect of the invention, a method and apparatus are provided for generating an axially symmetric laser beam from a laser resonator cavity employing non-axially symmetric unstable resonator mirrors. The foregoing may be achieved by replacing a conventional pair of non-axially symmetric resonator mirrors with a pair of cylindrical cross-sectional mirrors and a pair of cylindrical cross-sectional lenses. The lenses are positioned between the mirrors but are oriented ninety degrees with respect to the mirrors. With an appropriate choice for the radius of curvatures of the mirrors and the lenses, an output beam may be generated having a substantially axially symmetric divergence.

In a preferred embodiment, the unstable resonator cavity is employed within a pulsed excimer laser. The pair of cylindrical cross-sectional mirrors are positioned along an axis facing one another. At least one of the pair of mirrors has a convex reflecting surface. The pair of cylindrical cross-sectional lenses are positioned along the axis between the pair of mirrors. The lenses are oriented at about ninety degrees from the pair of mirrors. A gain medium is disposed between the pair of lenses and confined within a chamber having a rectangular cross-section. The radius of curvatures of the mirrors and lenses are selected to provide a substantially axially symmetric divergence pattern after a selected number of bounces of a laser pulse between the pair of mirrors.

By designing and fabricating mirrors and lenses having surfaces with appropriate radiuses of curvature, the pulsed resonator cavity of the excimer laser generates laser pulses having a minimal amount of axially non-symmetric beam divergence. Hence, the objectives noted above are achieved. Other objects and advantages of the invention will be apparent from the detailed description of the invention which follows, wherein both method and apparatus embodiments of the invention are described in detail.

DETAILED DESCRIPTION OF THE INVENTION

Figure 1:
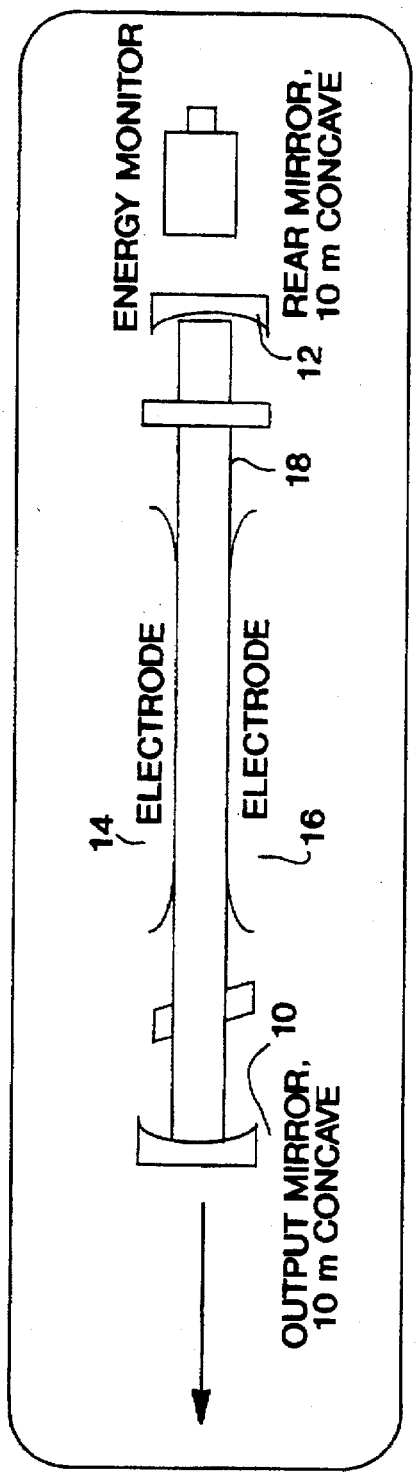
FIG. 1A illustrates a stable resonator cavity.
FIG. 1B illustrates an unstable resonator cavity.
Figure 2:
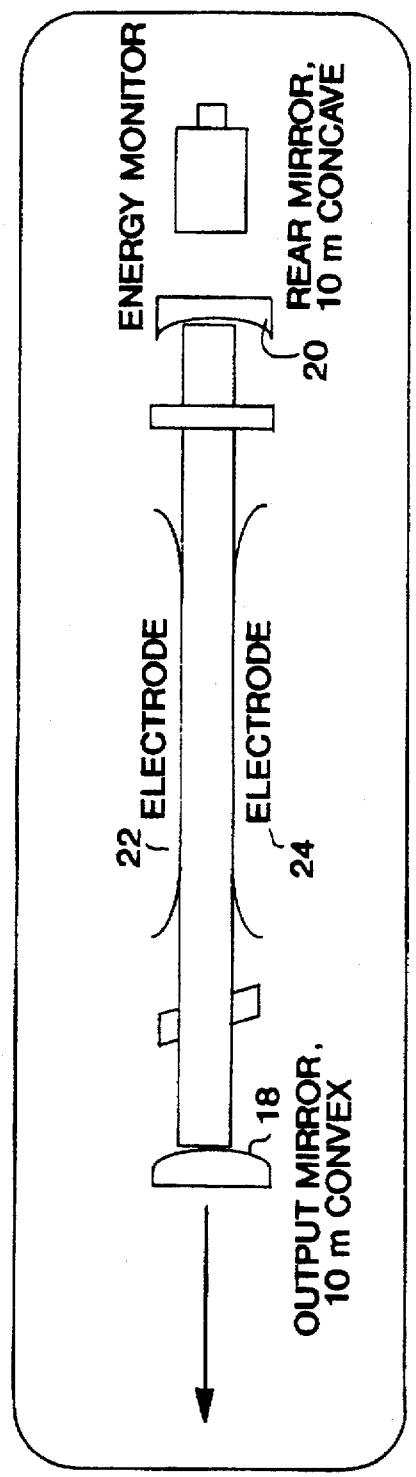
FIGS. 2A and 2B illustrate a practical implementation of an unstable resonator cavity having a rectangular cross-section.
Figure 3:
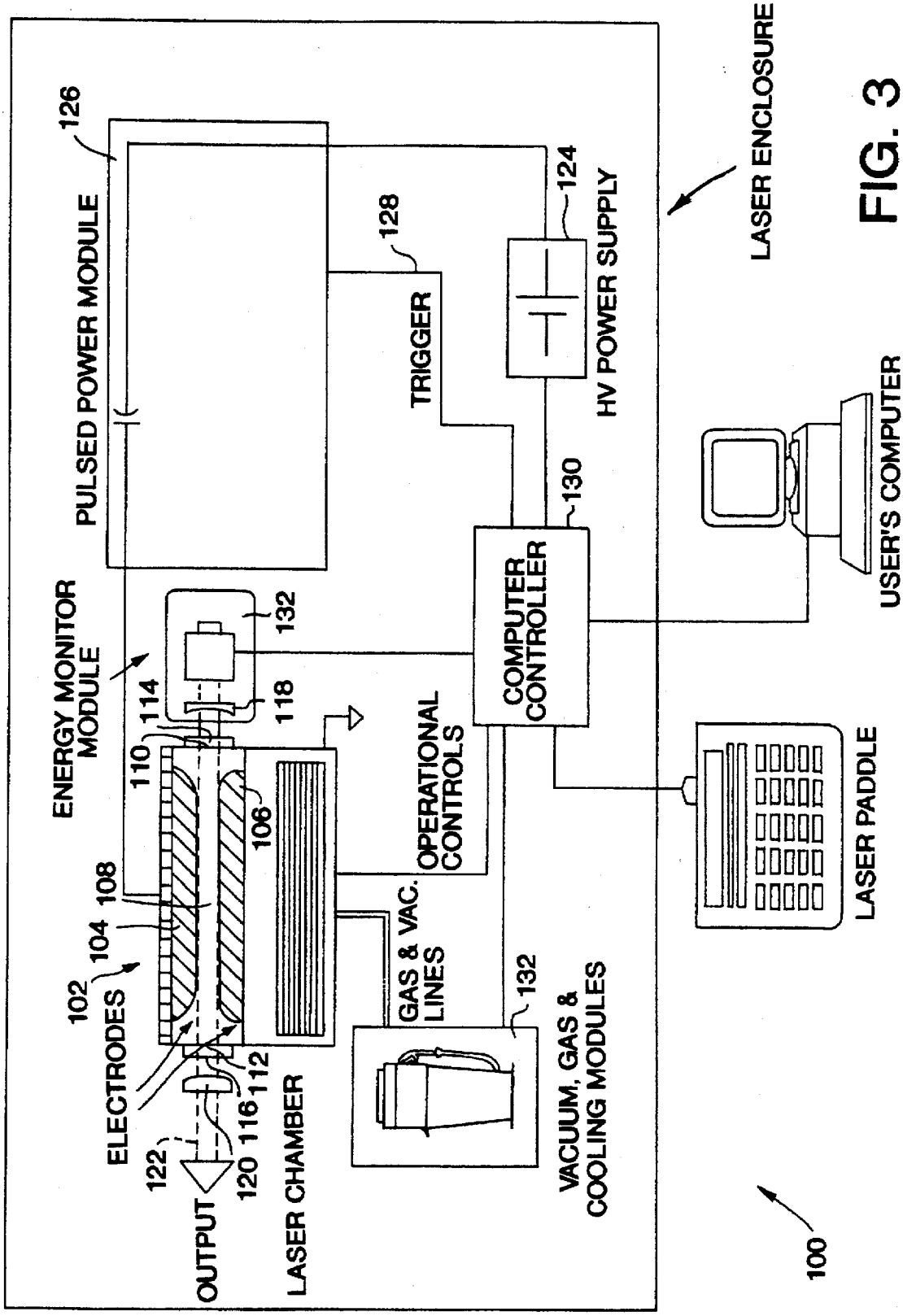
FIG. 3 is a block diagram, partially in schematic form, illustrating an excimer laser system having an unstable resonator cavity configured in accordance with a preferred embodiment of the invention.

FIG. 3 is a block diagram illustrating an excimer laser system 100 employing an anamorphic confocal unstable resonator cavity configured in accordance with the invention. Laser system 100 includes a resonator 102 having two or more electrodes 104 and 106 positioned longitudinally along a resonator cavity 108 which has a rectangular cross-section. Cavity 108 is filled with a lasing gas which may, for example, include a combination of krypton and fluorine. Opposing ends of chamber 108 include transparent windows 110 and 112. A pair of lenses 114 and 116 are positioned on the exterior of chamber 108 immediately beyond transparent windows 110 and 112, respectively. A pair of mirrors 118 and 120 are positioned immediately beyond lenses 114 and 116. Chamber 108, transparent windows 110 and 112, lenses 114 and 116 and mirrors 118 and 120 are axially aligned and together provide a resonator for generating and amplifying a sequence of laser pulses.

A laser beam composed of individual pulses is identified by reference numeral 122. Laser beam 122 is generated and controlled through various control systems illustrated in block diagram form within FIG. 3. A high voltage power supply 124 transmits power to electrodes 104 and 108 of resonator 102 through a pulsed power module 126. Pulsed power module 126 generates a sequence of high power pulses each triggered by a trigger signal received along line 128 from a controller 130. Pulsed power module 126 may include, for example, a thyratron in combination with various inductors, capacitors and resistors. As can be seen from FIG. 3, controller 130 is also directly connected to power supply 124, an energy monitor module 132, laser chamber 102 and a vacuum, gas, and cooling module 132. Vacuum, gas and cooling module 132 provides the excimer laser gas to chamber 108. Module 132 also includes a vacuum system for evacuating chamber 108 prior to providing the lasing gas. Module 132 further includes a cooling system for cooling the overall laser system, particularly resonator 102. Energy monitor module 132 is positioned adjacent to an outside surface of mirror 118. Mirror 118 is half-silvered to allow a portion of laser beam 122 to be transmitted into energy monitor module 132 which determines the amount of energy within each pulse and provides such information to controller 130. It should be noted that mirror 120 is also a half-silvered mirror allowing a portion of beam 122 to be transmitted as an output beam for use in a wide variety of applications, such as in the fabrication of integrated circuits. Controller 130 may be connected to, or may include, one or more computers or manual input devices for use in controlling the overall operation of the laser system.

The remainder of this detailed description will focus primarily on the configuration and operation of lenses 114 and 116 and mirrors 118 and 120 which are configured to minimize any axially non-symmetric divergence occurring within chamber 108 as a result of the rectangular cross-section of the chamber.

Figure 4A:
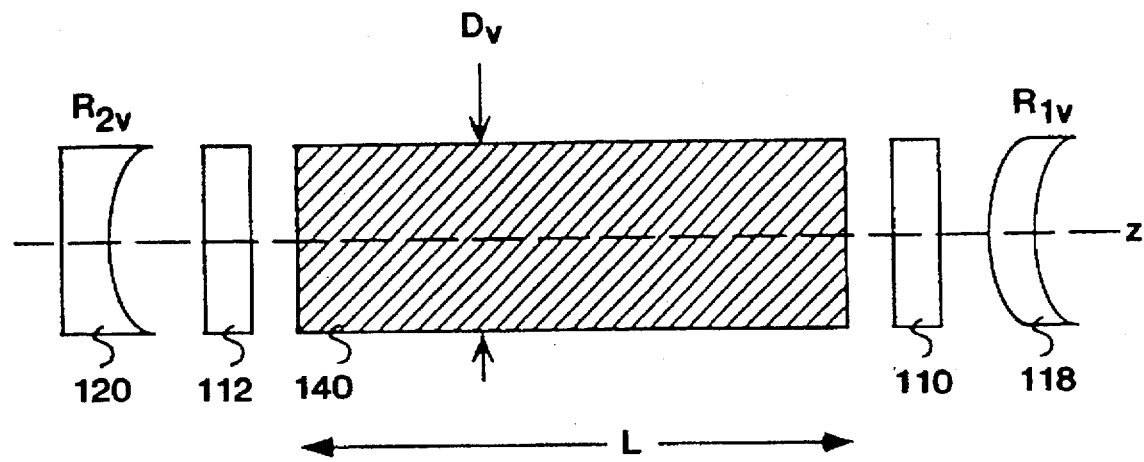
FIGS. 4A and 4B provide vertical and horizontal cross-sectional views of a portion of the unstable resonator cavity illustrated in FIG. 3.
Figure 4B:
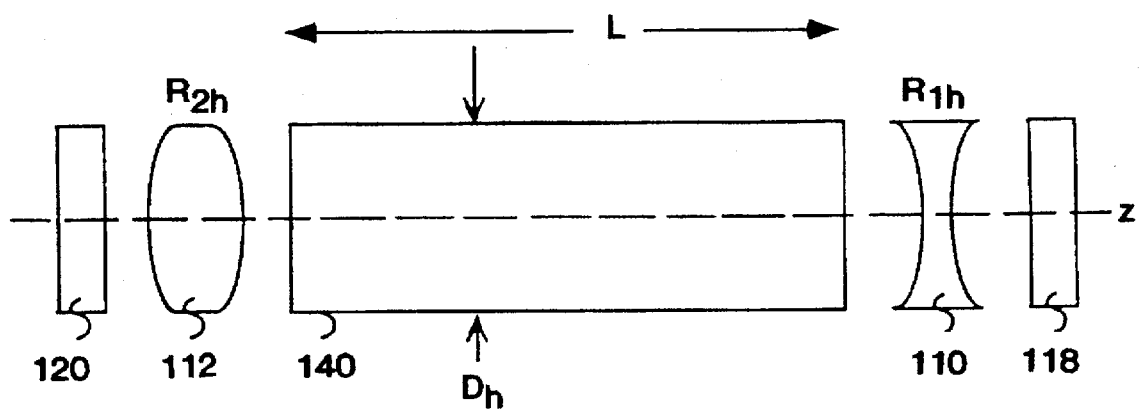

Referring to FIGS. 4A and 4B, lenses 110 and 112 and mirrors 118 and 120 and a gain medium 140 are illustrated independently of all other components of the laser system of FIG. 3. FIG. 4A provides a vertical cross-sectional view of the lenses, mirrors and gain medium, whereas FIG. 4B provides a horizontal cross-sectional view. As can be seen for a comparison of FIGS. 4A and 4B, each of the components is cylindrical, i.e. each component has a cross-section that remains constant along an internal axis. For example, mirrors 120 and 118 have a constant cross-section along the "h" direction, whereas lenses 110 and 112 each have a constant cross-section along the "v" direction. All components illustrated in FIGS. 4A and 4B have a horizontal width of $D_h$ and a vertical height of $D_v$. Gain medium 140 has a length of L and a longitudinal axis, z.

Lenses 110 and 112 and mirrors 118 and 120 are anamorphic optical components producing or having different magnification in the horizontal and vertical directions. Hence, each of these components is radially asymmetric. Lens 110, for example, has a concave cross-section taken horizontally but a flat cross-section taken vertically. Thus, lens 110 only magnifies in the horizontal direction while effectively providing only a transparent window in the vertical direction. Lens 112 has a convex cross-section in the horizontal direction but a flat cross-section in the vertical direction. Hence, like lens 110, lens 112 only magnifies in the horizontal direction.

Mirrors 118 and 120 are also asymmetric, but are oriented ninety degrees from lenses 110 and 112. In other words, an azimuthal angle of the mirrors about the longitudinal axis z is ninety degrees from an aximuthal axis of the lenses. More specifically, mirror 118 has a convexo-concave cross-section taken vertically but a flat cross-section taken horizontally. Mirror 120 has a concave cross-section taken vertically but a flat cross-section taken horizontally. Hence, mirrors 118 and 120 focus or diverge light only in the vertical direction while having no focusing or diverging effect in the horizontal direction. As noted above with respect to FIG. 3, both mirrors 118 and 120 are preferably half-silvered mirrors formed for allowing at least a portion of light reflecting between the mirrors to be transmitted through the mirrors either for use in detecting the amount of energy within the beam or for producing an output beam. A laser beam reflecting between mirrors 118 and 120 is preferably composed of a sequence of individual laser pulses. Each pulse tends to diverge as it bounces back and forth between the mirrors with the amount of divergence therefore varying as a function of the number of bounces. By providing a pair of asymmetric lenses in combination with a pair of asymmetric mirrors and by orienting the mirrors ninety degrees from the lenses, as illustrated in FIGS. 4a and 4B, an amount of divergence of the beam reflecting between the mirrors can be controlled and preferably minimized with a suitable choice of the various curvatures of the surfaces of the lenses and mirrors.

The following provides a method for determining the proper radius of curvatures of the surfaces of mirrors 118 and 120 and lenses 110 and 112 for given $D_v$, $D_h$ and L and for a given number of pulse bounces to achieve a symmetry of divergence.

First it should be noted that the following relations are satisfied for the configuration of FIGS. 4A and 4B:

$$R_{1v} + R_{2v} = 2L \quad\quad R_{1h} + R_{2h} = 2L$$

$$\frac{-R_{2v}}{R_{1v}} = M_v \quad\quad \frac{-R_{2h}}{R_{1h}} = M_h$$

$$\theta_{1v} = \frac{2D_v}{R_{2v}} \quad\quad \theta_{1v} = \frac{2D_h}{R_{2h}}$$

$$\theta_{nv} = \frac{\theta_{1v}}{M_v^{n-1}} \quad\quad \theta_{nh} = \frac{\theta_{1h}}{M_h^{n-1}}$$

Conventional unstable resonators have $R_{1v}=R_{1h}$ and $R_{2v}=R_{2h}$. If $D_v \neq D_h$ then $\theta_{1v} \neq \theta_{1h}$ and $\theta_{nv} \neq \theta_{nh}$ and the above-described asymmetry of divergence occurs.

To render the divergence symmetric, $\theta_{nv}$ must equal $\theta_{nh}$ for a selected value of n.

Thus:

$$\theta_{nv} = \theta_{nh}$$

$$\frac{\theta_{1v}}{M_v^{n-1}} = \frac{\theta_{1h}}{M_h^{n-1}} \; ; \text{and}$$

$$\frac{D_v}{R_{2v}M_v^{n-1}} = \frac{D_h}{R_{2h}M_h^{n-1}} \;.$$

The forgoing equation leads to the following relationship between $M_h$ and $M_v$:

$$M_h = \sqrt[n-1]{\frac{D_h}{D_v} \frac{R_{2v}}{R_{2h}}} \cdot M_v.$$

To design a resonator which achieves a desired value for $\theta_{nv} = \theta_{nh}$, first the following equations are solved for $R_{1v}$ and $R_{2v}$:

$$R_{1v} + R_{2v} = 2L; \text{ and}$$

$$-\frac{R_{2v}}{R_{1v}} = M_v = \sqrt[n-1]{\frac{2D_v}{R_{2v}\theta_{nv}}} \;.$$

Next, the following equations are solved for $R_{1h}$ and $R_{2h}$:

$$R_{1h} + R_{2h} = 2L; \text{ and}$$

$$-\frac{R_{2h}}{R_{1h}} = M_h = \sqrt[n-1]{\frac{D_h}{D_v} \frac{R_{2v}}{R_{2h}}} \cdot M_v.$$

By solving the foregoing equations with particular values for L, $D_v$ and $D_h$, appropriate values for $R_{1v}$, $R_{2v}$, $R_{1h}$ and $R_{2h}$ are determined. Once determined, lenses 110 and 112 and mirrors 118 and 120 are fabricated to have the calculated radius of curvatures, within an acceptable limit of tolerance. With regard to lenses 110 and 112, the lenses may be fabricated to provide focal lengths of $$f_{1h} = \frac{1}{2} R_{1h} \text{ and } f_{2h} = \frac{1}{2} R_{2h}.$$

As an example, consider a resonator having a length L=1,200 millimeters (mm) where $D_v$ is equal to $2D_h$. If a divergence of 0.2 milliradians is acceptable for both the vertical and horizontal directions after four bounces, the following radiuses of curvature and magnifications are needed:

$R_{1v} = -800$ mm $\quad R_{2v} = 3200$ mm $\quad M_v = 4$ $R_{1h} = -1153$ mm $\quad R_{2h} = 3553$ mm $\quad M_h = 3.07 M_v$ For other applications, a greater or lesser amount of divergence may be acceptable within a fewer or larger number of bounces n. It should be noted that, for the foregoing example wherein $D_v$ is equal to twice $D_h$, the actual numerical values for $D_v$ and $D_h$ are not needed. It should also be noted that there may be certain regimes of parameters where the foregoing equations cannot be solved to achieve real values. Hence, it may not always be possible to achieve an arbitrarily small amount of divergence within an arbitrarily short number of bounces for a practical laser system. Those skilled in the art will appreciate that other practical limitations may apply to the above generally-described method.

Figure 5:
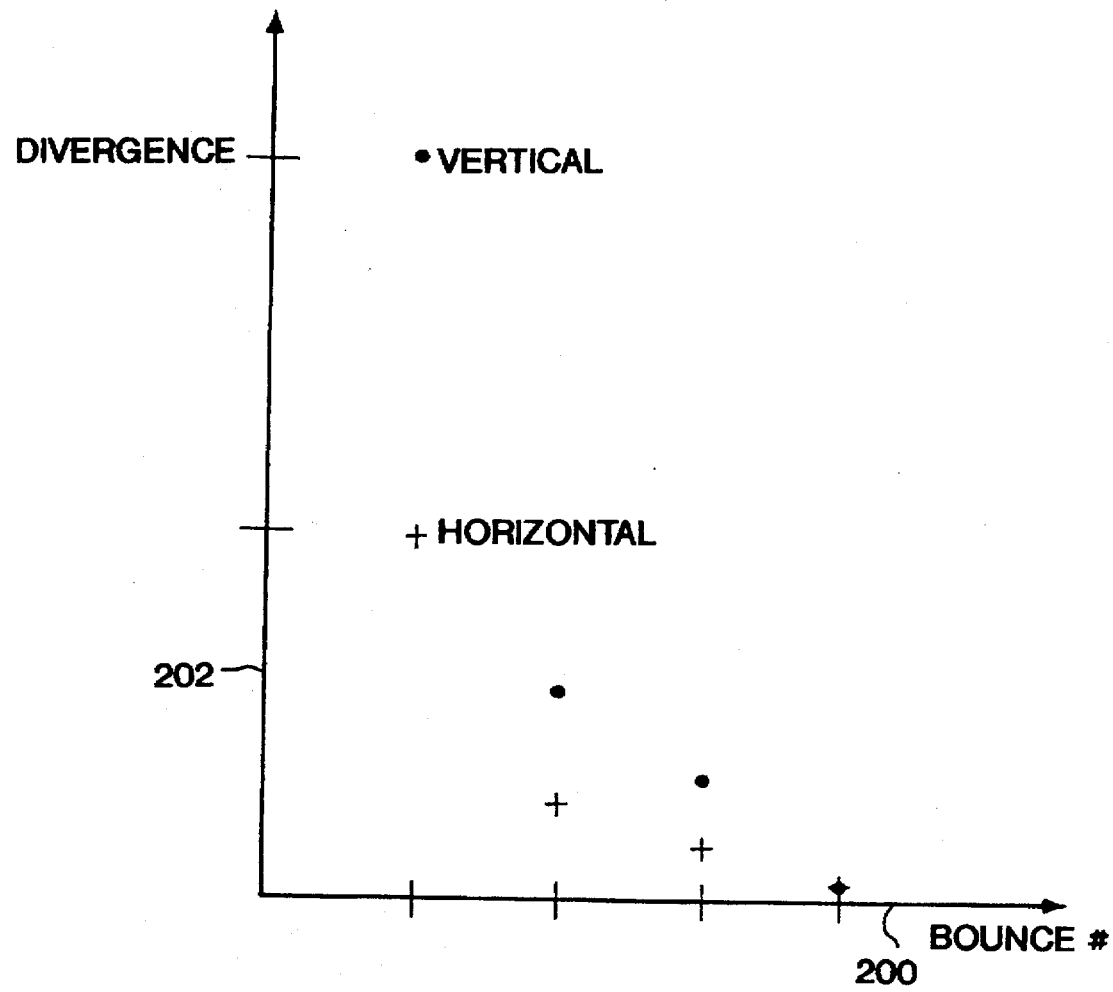
FIG. 5 is a graph illustrating vertical and horizontal divergence as a function of the number of bounces for a pulsed laser beam within the laser system of FIG. 3.

For a resonator configured with lenses and mirrors constructed in accordance with the foregoing method, the amount of horizontal and vertical divergence decreases with each bounce of the laser pulse. This effect is illustrated in FIG. 5 for the example parameters described above. FIG. 5 illustrates the number of bounces N along axis 200 and the divergence in milliradians along axis 202. The amount of vertical divergence at each incremental bounce number is illustrated by a dot whereas the amount of horizontal divergence at each incremental bounce number is illustrated by a "+" sign. As can be seen from FIG. 5, the amount of vertical and horizontal divergence decreases with each bounce, with the difference between the vertical and horizontal divergence being substantially eliminated at bounce number 4. It should be noted that the divergence itself is not completely eliminated at bounce number 4. Rather, it is the difference between the vertical and horizontal divergence which is substantially eliminated. The amount of actual divergence may be further minimized by employing a greater number of bounces.

Thus, FIG. 5 illustrates a primary advantage of configuring a resonator cavity as illustrated in FIGS. 4A and 4B. Other advantages will be apparent to those skilled in the art. Furthermore, although the invention has been described primarily with reference to a resonator having lenses and mirrors offset by ninety degrees, each having cylindrical reflecting surfaces, the invention may also be implemented in other configurations which are consistent with the general principles of the invention. Hence, the foregoing descriptions of preferred and exemplary embodiments are primarily provided to illustrate the invention, and the scope of the invention should not be limited by these examples. Rather principles of the invention may be embodied within a wide variety of systems and configurations for a wide range of applications.

I claim:

1. In a pulsed laser system having an unstable resonator with a single pair of non-axially symmetric resonator mirrors disposed on opposing ends of said resonator cavity having an axis, and providing an output sequence of pulses having a non-axially symmetric divergence, an improvement comprising:
   replacing said pair of non-axially symmetric resonator mirrors with a pair of mirrors having cylindrical reflecting surfaces oriented at a first azimuthal angle with respect to said axis and a pair of cylindrical lens positioned between said pair of mirrors and oriented at a second azimuthal angle with respect to said axis.

2. The improvement of claim 1, wherein said first angle is about ninety degrees from said second angle.

3. The improvement of claim 1, wherein radiuses of curvatures of said mirrors and said lenses are selected to provide for substantially axially-symmetric divergence of said laser pulses after a preselected number bounces of said laser pulses between said mirrors.

4. The improvement of claim 1, wherein a first of said pair of mirrors has a radius of curvature of $R_{1v}$, a second of said pair of mirrors has a radius of curvature of $R_{2v}$, a first of said pair of lenses has a focal length of $f_{1h}$, and a second of said pair of lenses has a focal length of $f_{2h}$, said gain medium has a vertical width of $D_v$, a horizontal width of $D_h$ and length of L, and wherein $R_{1v}$, $R_{2v}$, $f_{1h}$, $f_{2h}$, L, $D_v$ and $D_h$ have values substantially satisfying the following conditions:

$$-\frac{R_{2v}}{R_{1v}} = M_v = \sqrt[n-1]{\frac{2D_v}{R_{2v}\theta_{mv}}} \; ;$$

$$R_{1H} + R_{2H} = 2L;$$

$$-\frac{R_{2h}}{R_{1h}} = M_h = \sqrt[n-1]{\frac{D_h}{D_v} - \frac{R_{2v}}{R_{2H}}} - M_v; \text{ and}$$

$$f_{1h} = \frac{1}{2} R_{1h} \text{ and } f_{2h} = \frac{1}{2} R_{2h}.$$

5. An unstable resonator for a pulsed laser, said resonator comprising:

a pair of mirrors having cylindrical reflecting surfaces positioned along an axis and oriented at a first azimuthal angle with respect to the axis, said mirrors facing one another, with a first of said pair of mirrors has a convex reflecting surface; and a pair of cylindrical lenses positioned along said axis between said pair of mirrors and oriented at a second azimuthal angle with respect to the axis.

6. The apparatus of claim 5, wherein said first angle is about ninety degrees from said second angle.

7. The apparatus of claim 5, wherein a second of said pair of mirrors has a concave reflecting surface.

8. The apparatus of claim 7, wherein a first of said lenses is a concave lens and wherein a second of said pair of lenses is a convex lens.

9. The apparatus of claim 8, wherein said convex lens is disposed adjacent to said first mirror and said concave lens is disposed adjacent to said second mirror.

10. The apparatus of claim 5, wherein said mirrors have rectangular reflecting surfaces.

11. The apparatus of claim 5, wherein radiuses of curvatures of said mirrors and said lenses are selected to provide for substantially axially-symmetric divergence of said laser pulses after a preselected number bounces between said mirrors.

12. The apparatus of claim 11, wherein said first mirror has a radius of curvature of $R_{1v}$, a second of said pair of mirrors has a radius of curvature of $R_{2v}$, a first of said pair of lenses has a focal length of $f_{1h}$ and a second of said pair of lenses has a focal length of $f_{2h}$, said gain medium has a vertical width of $D_v$, a horizontal width of $D_h$ and length of L, and wherein $R_{1v}$, $R_{2v}$, $f_{1h}$, $f_{2h}$, L, $D_v$ and $D_h$ have values substantially satisfying the following conditions:

$$-\frac{R_{2v}}{R_{1v}} = M_v = \sqrt[n-1]{\frac{2D_v}{R_{2v}\theta_{mv}}} \; ;$$

$$R_{1H} + R_{2H} = 2L;$$

-continued $$-\frac{R_{2h}}{R_{1h}} = M_h = \sqrt[n-1]{\frac{D_h}{D_v} - \frac{R_{2v}}{R_{2H}}} - M_v; \text{ and}$$

$$f_{1h} = \frac{1}{2} R_{1h} \text{ and } f_{2h} = \frac{1}{2} R_{2h}.$$

13. A laser system comprising:

a resonator cavity having an asymmetric cross-section;

a lazing medium disposed within said resonator cavity between said pair of lenses;

means for generating laser beam pulses within said resonator cavity; and means for providing a symmetric divergence pattern to said laser pulses.

14. The laser system of claim 13, wherein said means for providing a symmetric divergence pattern comprises:

a pair of mirrors with cylindrical reflecting surfaces positioned at opposing ends of said resonator cavity along a longitudinal axis of said resonator cavity, said pair of mirrors being oriented at a first azimuthal angle with respect to the axis, said mirrors facing one another, with a first of said pair of mirrors has a convex reflecting surface; and a pair of cylindrical lenses positioned along said axis between said pair of mirrors and oriented at a second azimuthal angle with respect to the axis.

15. The apparatus of claim 14, wherein said first angle is about ninety degrees from said second angle.

16. The apparatus of claim 14, wherein a second of said pair of mirrors has a concave reflecting surface.

17. The apparatus of claim 16, wherein a first of said lenses is a concave lens and wherein a second of said pair of lenses is a convex lens.

18. The apparatus of claim 17, wherein said convex lens is disposed adjacent to said first mirror and said concave lens is disposed adjacent to said second mirror.

19. The apparatus of claim 14, wherein said mirrors have rectangular reflecting surfaces.

20. The apparatus of claim 14, wherein radiuses of curvatures of said mirrors and said lenses are selected to provide for substantially axially-symmetric divergence of said laser pulses after a preselected number bounces between said mirrors.

21. The apparatus of claim 20, wherein said first mirror has a radius of curvature of $R_{1v}$, a second of said pair of mirrors has a radius of curvature of $R_{2v}$, a first of said pair of lenses has a focal length of $f_{1h}$ and a second of said pair of lenses has a focal length of $f_{2h}$, said gain medium has a vertical width of $D_v$, a horizontal width of $D_h$ and length of L, and wherein $R_{1v}$, $R_{2v}$, $f_{1h}$, $f_{2h}$, L, $D_v$ and $D_h$ have values substantially satisfying the following conditions:

$$-\frac{R_{2v}}{R_{1v}} = M_v = \sqrt[n-1]{\frac{2D_v}{R_{2v}\theta_{mv}}} \; ;$$

$$R_{1H} + R_{2H} = 2L;$$

$$-\frac{R_{2h}}{R_{1h}} = M_h = \sqrt[n-1]{\frac{D_h}{D_v} - \frac{R_{2v}}{R_{2H}}} - M_v; \text{ and}$$

$$f_{1h} = \frac{1}{2} R_{1h} \text{ and } f_{2h} = \frac{1}{2} R_{2h}.$$

22. A method for providing a substantially axially symmetric divergence to a laser pulse from an unstable laser resonator having an asymmetric resonator cavity with width $D_h$ and height $D_v$, said method comprising the steps of:

configuring a pair of mirrors having cylindrical reflecting surfaces;

configuring a pair of cylindrical lenses;

positioning said pair of mirrors and said pair of lenses within resonator cavity, with said reflecting surfaces said mirrors facing one another, with said lenses positioned between said mirrors, and with said mirrors being oriented at a first azimuthal angle with respect to a longitudinal axis of said resonator cavity and with said lenses being oriented at a second azimuthal angle with respect to said axis.

23. The method of claim 22, wherein said steps of configuring said pair or mirrors and said pair of lenses comprises the steps of:

determining values for $f_{1h}$, $f_{2h}$, $R_{1h}$ and $R_{2h}$ satisfying the conditions that $$-\frac{R_{2v}}{R_{1v}} = M_v = \sqrt[n-1]{\frac{2D_v}{R_{2v}\theta_{rv}}} \ ;$$

-continued $$R_{1H} + R_{2H} = 2L;$$

$$-\frac{R_{2h}}{R_{1h}} = M_h = \sqrt[n-1]{\frac{D_h}{D_v} - \frac{R_{2v}}{R_{2H}}} - M_v; \text{ and}$$

$$f_{1h} = \frac{1}{2} R_{1h} \text{ and } f_{2h} = \frac{1}{2} R_{2h}.$$

wherein n is a selected number of bounces within said resonator after which said divergence is substantially symmetric;

configuring said reflecting surfaces of said mirrors with radiuses of $R_{1h}$ and $R_{2h}$, respectively; and configuring said lenses with focal lengths of $f_{1h}$, $f_{2h}$, respectively.

* * * * *